United States Patent

[11] 3,609,138

| [72] | Inventors | Robert Paul Mull<br>Florham Park;<br>George De Stevens, Summit, both of N.J. |
|---|---|---|
| [21] | Appl. No. | 692,640 |
| [22] | Filed | Dec. 22, 1967 |
| [45] | Patented | Sept. 28, 1971 |
| [73] | Assignee | Ciba Corporation<br>Summit, N.J.<br>Continuation-in-part of application Ser. No. 523,969, Feb. 1, 1966, now abandoned. |

[54] 1-ARYL-3-BENZAZEPINES
3 Claims, No Drawings

[52] U.S. Cl. .................................................. 260/239,
260/240, 260/288, 260/294.8, 260/295.5,
260/296, 260/326.15, 260/329, 260/332.3,
260/340.3, 260/340.5, 260/347.3, 260/347.7,
424/244

[51] Int. Cl. ........................................................ C07d 41/08
[50] Field of Search ........................................... 260/239 BB

[56] References Cited
UNITED STATES PATENTS
3,393,192  7/1968  Walter et al. .................  260/239

*Primary Examiner* — Alton D. Rollins
*Attorneys* — Harry Goldsmith, Joseph G. Kolodny and Bryant W. Brennan

ABSTRACT: 3-Aliphatically substituted 1-aryl-1,2-dihydro- or 1,2,4,5-tetrahydro-3-benzazepines, e.g. those of the formula

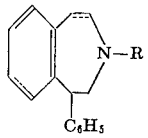

R = aliphatic or araliphatic radical
N-oxides, quaternaries and salts thereof are central nervous system depressants.

1-ARYL-3-BENZAZEPINES

CROSS-REFERENCES TO RELATED APPLICATIONS

This is a continuation-in-part of application Ser. No. 523,969 filed Feb. 1, 1966, now abandoned.

SUMMARY OF THE INVENTION

The present invention concerns and has for its object the provision of 3-aliphatically substituted 1-aryl-1, 2-dihydro- or 1,2,4,5-tetrahydro-3benzazepines, more particularly those of the Formula I

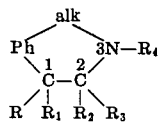

in which Ph is a 1,2-phenylene radical, R is an aryl radical, each of $R_1$, $R_2$ and $R_3$ is hydrogen or lower alkyl, $R_4$ is an aliphatic or araliphatic radical and alk is lower alkylene or alkenylene separating Ph from the 3-nitrogen atom by two ring-carbon atoms, the N-oxides quaternaries and salts thereof, as well as of corresponding pharmaceutical compositions and methods for the preparation of these products. Said compositions are preferably useful as tranquillizers muscle relaxants or adjuncts of anesthetics, for example, in the treatment of the common psychoneuroses or the control of disturbed psychotics.

DESCRIPTION OF THE PREFERRED EMBODIMENTS

The 1,2-phenylene radical Ph is unsubstituted or substituted by one or more than one of the same or different substituents attached to any of the positions available for substitution. Such substituents are, for example, lower alkyl, such as methyl, ethyl, n- or i-propyl, n-, i- or secondary butyl, etherified or esterified hydroxy or mercapto, for example, lower alkoxy, alkylenedioxy or alkylmercapto, such as methoxy, ethoxy, n- or i-propoxy or n-butoxy, methylenedioxy, 1,1- or 1,2-ethylenedioxy, methyl- or ethylmercapto, or halogen, such as fluoro, chloro or bromo, trifluoromethyl, nitro or amino, such as di-lower alkylamino, e.g. dimethylamino or diethylamino. The term "lower," referred to above and hereinafter in connection with organic radicals or compounds respectively, defines such with up to seven, preferably up to four, carbon atoms.

The aryl radical R is, for example, carbocyclic or heterocyclic mono- or bicyclic aryl, such as phenyl, naphthyl, thienyl, furyl, pyridyl, quinolyl or isoquinolyl. It preferrably stands for unsubstituted or substituted phenyl. These radicals may contain one or more than one of the same or different substituents, such as those mentioned for the phenylene radical Ph.

A lower alkyl radical $R_1$, $R_2$ and/or $R_3$ is, for example, one of those mentioned above; it preferably stands for methyl.

An aliphatic radical $R_4$ is, for example, lower alkyl or alkenyl, such as the alkyls mentioned above, but also straight or branched pentyl, hexyl or heptyl bound in any position, or allyl, methallyl, 2- or 3-butenyl or farnesyl, furthermore, cycloalkyl, cycloalkenyl, cycloalkyl-lower alkyl or cycloalkenyl-lower alkyl containing preferably three to seven ring-carbon atoms, such as cyclopropyl, cyclopentyl, cyclohexyl or cycloheptyl, 3-cyclopentenyl, 2- or 3-cyclohexenyl, cyclopentyl-methyl, 2-cyclopentyl-ethyl, cyclohexyl-methyl, 2-cyclohexyl-ethyl or 3-cyclopropyl-propyl, 3-cyclopentenyl-methyl, 2-cyclopent-3-enyl-ethyl, 3-cyclohexenyl-methyl or 2-cyclohex-3-enyl-ethyl. An araliphatic radical $R_4$ is preferably phenyl-lower alkyl or -alkenyl, such as benzyl, 1- or 2-phenyl-ethyl or cinnamyl. These radicals are unsubstituted or substituted in the aromatic portion by one or more than one of the same or different substituents, for example, by those mentioned for the 1,2-phenylene radical Ph and/or in the aliphatic portion by free, etherified or esterified hydroxy or mercapto, which is separated from the 3-nitrogen atom by at least 2-carbon atoms, such as the above-mentioned lower alkoxy or alkylmercapto, free or N-lower alkylated guanylmercapto, halogeno or lower alkanoyloxy, e.g. acetoxy, propionyloxy, butyryloxy or pivalyloxy. Such substituted aliphatic radicals are preferably the following 2-hydroxy- or mercapto-ethyl, -propyl or -butyl, 3-hydroxy- or mercapto-propyl, -butyl or -pentyl, 4-hydroxy- or mercapto-butyl, -pentyl or -hexyl; 2,3-dihydroxy-propyl or -butyl or 3,4-dihydroxy-butyl or -pentyl; the corresponding guanylmercaptoalkyl groups in which the guanyl radical is unsubstituted or substituted by up to three lower alkyl groups, as well as haloalkyl groups in which the halogen atom is preferably fluoro, chloro or bromo, and the corresponding hydroxyalkyl groups fully or partially esterified with a lower alkanoic acid.

The lower alkylene or alkenylene group alk is preferably 1,2-ethylene or 1,2-ethenylene but also 1,2-propylene, 1,2- or 2,3-butylene, 1,2- or 2,32,3-pentylene, 1,2-, 2,3- or 3,4-hexylene or 3,4-heptylene; 1,2-prop-1-enylene, 2,3-but-2-enylene, 2,3-pent-2-enylene or 3,4-hex- 3-enylene.

The compounds of the invention exhibit valuable pharmacological properties. Apart from some hypotensive effects, they show primarily a central nervous system depressing activity, as can be demonstrated in animal tests using, for example mammals, such as mice or dogs, as test objects. Besides their above-mentioned utility, the compounds of the invention are also useful intermediates in the preparation of other valuable products, preferably of pharmacologically active compounds.

Particularly useful are compounds of the Formula I, in which Ph and R are unsubstituted 1,2-phenylene and phenyl respectively or these radicals substituted by up to two members selected from the group consisting of lower alkyl, lower alkoxy, lower alkylenedioxy, halogeno and trifluoromethyl, each of $R_1$, $R_2$ and $R_3$ is hydrogen, alk is 1,2-ethylene and $R_4$ is lower alkyl, lower alkenyl, hydroxy-lower alkyl, mercapto-lower alkyl, guanylmercapto-lower alkyl, halo-lower alkyl, lower alkanoyloxy-lower alkyl or R-lower alkyl in which the heteroatoms are separated from the 3-nitrogen atom by at least 2 carbon atoms, and acid addition salts thereof.

Compounds that are especially valuable are those of the Formula II

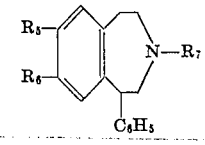

(II)

wherein $R_5$ is hydrogen or methoxy, $R_6$ is hydrogen, methoxy or chloro and $R_7$ is methyl, ethyl, 2hydroxyethyl, 2-guanylmercaptoethyl, 2 -chloroethyl or benzyl, and their therapeutically acceptable acid addition salts, which, when given subcutaneously to mice at doses between about 1 and 50 mg./kg./ day show outstanding central nervous system depressing activity.

The compounds of the invention are prepared by methods in themselves known, for example, the process consists in a. reducing in a 3-aliphatically substituted 11-aryl-1,2-dihydro- or 1,2,4,5-tetrahydro-3-benzazepine containing in the ring and/or the aliphatic 3-substituent at least one carbamyl grouping, said grouping to the methyleneimino grouping or b. reacting a 3unsubstituted 1-aryl- 1,2-dihydro- or 1,2,4,5-tetrahydro-3-benzazepine with a reactive ester of an aliphatic alcohol or a corresponding epoxide or c. reducing the condensation product of a 3-unsubstituted 1-aryl- 1,2-dihydro- or 1,2,4,5-tetrahydro-3-benzazepine with an aliphatic aldehyde or ketone or a functional derivative thereof or d. condensing a reactive ester of a 1-(β-hydroxy-alkyl or α-alkenyl)- 2- (α-aryl-β-hydroxyl-alkyl)-benzene with a primary aliphatic amine or e. ring-closing an N-aliphatically monosubstituted 1-(β-aminoalkyl)-2-(α-hydroxy-alkyl)-benzene having in one of the α-positions of said side chains an aryl radical and in the other a single or double bond, or a reactive ester thereof and, if desired, converting a resulting compound into another compound of the invention.

The reduction according to item (a) is carried out, for example, with the use of complex light metal hydrides, such as lithium aluminum hydride, or with hydrogen, e.g. under electrolytic conditions.

A reactive ester mentioned under items (b), (d) and (e) is, for example, that of a hydrohalic or sulfonic acid, such as hydrochloric, hydrobromic, methane-, ethane-, benzene- or p-toluenesulfonic acid. Said esters are advantageously used in the presence of basic condensing agents, such as alkali or alkaline earth metal carbonates or bicarbonates or tertiary nitrogen bases, such as triethylamine, N, N-dimethyl-aniline or pyridine. Epoxides may advantageously be reacted in the presence of small amounts of water and/or acids, e.g. hydrochloric acid.

The reduction according to item (c) is carried out, for example, with the use of catalytically activated or nascent hydrogen, such as hydrogen in the presence of platinum, palladium or nickel catalysts, or hydrogen generated by an alkali metal in an alcohol or by electrolysis. Also other reducing agents may be used, such as those mentioned under (a), formic acid and the like. A functional derivative of the aldehyde or ketone is, for example, an acetal of a lower alkanol or alkanediol or a bisulfite adduct.

The condensation mentioned under item (d) may be carried out in one or two steps, in the latter instance compounds mentioned under item (e) are obtained. In case they are reactive esters, the reaction conditions are analogous to those mentioned for (b). Free β-hydroxyalkyl compounds are advantageously ring closed in the presence of dehydrating agents, such as sulfuric or polyphosphoric acid or carbodiimides.

The compounds of the invention so obtained may be converted into each other by methods in themselves known. Thus, for example, a compound unsaturated in the 4,5-positions and/or the aliphatic moiety may be hydrogenated with catalytically activated or nascent hydrogen, or the latter reacted with water, hydrogen peroxide, an alcohol or mercaptan, a hydrohalic, hypohalous, alkanoic or alkane percarboxylic acid and solvolysing any epoxide formed. Compounds containing in the aliphatic 3-substituent radicals not specifically mentioned above, but capable of being converted into free, etherified or esterified hydroxy or mercapto, such as sulfonyloxy, diazo, amino, acylamino, oxo or carboxy, may be converted to said free or functionally modified hydroxy or mercapto compounds. Sulfonyloxy compounds may be reacted with metal hydroxides, alkanolates, alkylmercaptides, carboxylates or halides. Diazonium salts may be reacted with water, alkanols, alkanoic or hydrohalic acids, advantageously in the presence of catalysts, such as cuprous halides. Amino compounds may be converted into the corresponding hydroxy- or halocompounds by reaction with nitrous acid or nitrosyl halides and acylamino e.g. benzoylamino compounds by reaction with phosphorus pentahalogenides. Salts, especially the silver salts of carboxy compounds, may be reacted with halogen, e.g. chlorine or bromine, whereby carbon dioxide is split off and the corresponding halo-compounds are formed. Oxo or carboxy compounds can be reduced, for example, with catalytically activated or nascent hydrogen, by reaction with a metal, e.g. Grignard compound, an alcohol in the presence of aluminum alkoxides or advantageously with a complex light metal hydride. Compounds containing in the aliphatic 3-substituent a hydroxy group, may be esterified, i.e. reacted with a halogenating agent, such as thionyl chloride or phosphorus oxychloride, an alkanoic acid halide or anhydride. Esters obtained may be hydrolyzed or transesterified, hydrohalic esters reacted with metal hydroxides, hydrosulfides, alkanolates, alkylmercaptides, thiourea and the like.

The N-oxides of the invention are obtained, for example, by reacting the free bases with hydrogen peroxide or a peracid, e.g. peracetic, perbenzoic or monoperphthalic acid. Quaternaries are formed by reaction of the bases with a reactive ester of an alcohol, preferably that of a lower alkanol with a hydrohalic acid.

The above-mentioned reactions are carried out according to standard methods, in the presence or absence of diluents, preferably such as are inert to the reagents and are solvents thereof, of catalysts, condensing agents and/or inert atmospheres, at atmospheric or superatmospheric pressure, at low temperatures, room temperature or elevated temperatures.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchanges. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic; aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzene-sulfonic, toluenesulfonic, naphthalenesulfonic and sulfanilic acid; methionine, tryptophan, lysine and arginine.

These or other salts of the new compounds, for example, the picrates, can be used also for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly, those starting materials should be used in the reactions of the invention that lead to the formation of those compounds indicated above as being specially valuable.

The starting materials are known, or if they are new, may be prepared by methods in themselves known. Those mentioned under item (a) may be prepared as shown in Compt. Rend. 255, 1619 (1962), those under item (b) and (c) according to Ann. Chim. 10, 213 (1965) and Ann. Chim. 8, 255 (1963). The starting material mentioned under item (d) may be obtained by reaction of a 2-(1-alkenyl)-phenylmagnesium halide with an aryl alkyl ketone, dehydrating the condensation product and adding water or a hydrogen halide to the resulting 1-aryl-1-(-alk- 1-enyl-phenyl)-1-alkene, the latter advantageously in the presence of peroxides. Performing said hydrohalogenation partially and reacting the resulting monohalo compound first with an aliphatic amine and then continuing said addition reaction, the compounds mentioned under item (e) are obtained.

Starting materials or final products that are mixtures of isomers may be separated into simple isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into the stereoisomeric pure racemates (diastereoisomers), for example, by chromatography and/or fractional crystallization. Racemic products can likewise by resolved into the optical antipodes, for example, by reaction with optically active acids, separation of the diastereomeric salts and liberation of the bases from the salts.

The compounds of the invention can be used in the free form or in the form of their salts, for example, for the manufacture of pharmaceutical preparations containing the said compounds in admixture with organic or inorganic, solid or liquid pharmaceutical excipients suitable especially for enteral but also for perenteral administration. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly and other known medicinal excipients. The pharmaceutical preparations may be, for example, tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They may further contain other therapeutically valuable substances. The pharmaceutical preparations are prepared by conventional methods.

The following examples illustrate the invention; temperatures are given in Centigrade and all parts given are parts by weight.

EXAMPLE 1

The mixture of 6.0 g. 7,8-dimethoxy-1-phenyl-1,2,4,5-Tetrahydro-3-benzazepine, 5.0 g. 37 percent aqueous formaldehyde and 10.0 g. formic acid is refluxed for 20 hours and then concentrated in vacuo. The residue is dissolved in the minimum amount of water necessary for dissolution, the solution made basic with 40 percent aqueous sodium hydroxide, extracted with methylene chloride, the extract washed with brine, dried and evaporated. The residue is distilled under reduced pressure and the fraction boiling at 190° and 0.15 mm. Hg collected; it represents the 7,8-dimethoxy-3-methyl-1-phenyl-1,2,4,5-tetrahydro-3-benzazepine of the formula

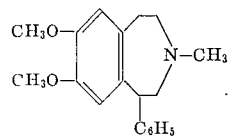

The starting material is prepared as follows: To the stirred, boiling suspension of 7.7 g. lithium aluminum hydride in 500 ml. tetrahydrofuran 30.0 g. 7,8-dimethoxy-2-oxo-1-phenyl-1,2,4,5tetrahydro-benzazepine in 500 ml. tetrahydrofuran are added dropwise and the mixture is refluxed for 6 days. After cooling 7.7 ml. water, 5.8 ml. 20 percent aqueous sodium hydroxide and 27 ml. water are added in this order, the mixture is filtered and the filtrate evaporated. The residue is triturated with diethyl ether and the remaining 2-oxo compound filtered off. The filtrate is evaporated, the residue distilled and the fraction boiling at 185°/0.15 mm. Hg collected; it represents the 7,8-dimethody-1-phenyl-1,2,4,5-tetrahydro-3-benzazepine.

EXAMPLE 2

To the stirred mixture of 28.0 g. 7,9-dimethoxy-1-phenyl-1,2,4,5-tetrahydro-3-benzazepine, 250 ml. benzene, 10.6 g. sodium carbonate and 1 drop water the solution of 12.5 g. 2-bromo-ethanol in 100 ml. benzene is added and the whole is refluxed for 20 hours. After cooling the mixture is filtered, the filtrate evaporated, the residue distilled under reduced presrepresents the 3-(β-hydroxyethyl)-7,8-dimethoxy-1-phenyl-1,2,4,5-tetrahydro-3benzazepine of the formula

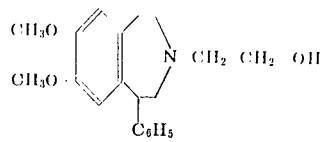

EXAMPLE 3

To the solution of 17.0 g. 3-(βhydroxyethyl)-7,8-dimethoxy-1-phenyl-1,2,4,5-tetrahydro-3-benzazepine in 100 ml. benzene the solution of 6.8 g. thionyl chloride in 100 ml. benzene is added dropwise while stirring. Hereupon the mixture is refluxed for 5 hours and stirred overnight. It is concentrated in vacuo and residue recrystallized from diethyl ether to yield the 3-(β-chloroethyl)-7,8-dimethoxy-1-phenyl-1,2,4,5-tetrahydro-3-benzazepine hydrochloride of the formula

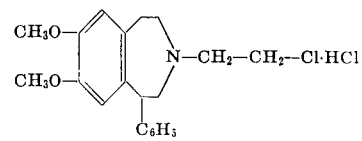

melting at 90°.

EXAMPLE 4

To the solution of 4.0 g. 3-(β-chloroethyl)-7,8-dimethoxy-1-phenyl-1,2,4,5-tetrahydro-3-benzazepine hydrochloride in 50 ml. ethanol, the solution of 0.87 g. thiourea in 30 ml. ethanol is added, the mixture is refluxed for 8 hours and stirred overnight at room temperature. It is concentrated in vacuo, the residue triturated with diethyl ether and the solid formed filtered off. It is recrystallized from ethanol-diethyl ether-benzene to yield the 3-(β-guanylmercapto-ethyl)-7,8-dimethoxy-1-phenyl-1,2,4,5-tetrahydro-3-benzazepine dihydrochloride of the formula

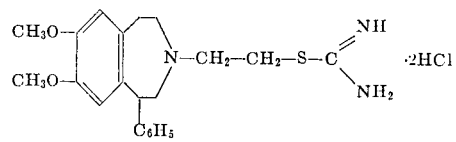

melting at 185°-190°.

EXAMPLE 5

To the stirred suspension of 11.4 g. lithium aluminum hydride in 1 liter tetrahydrofuran the solution of 40.0 g. 3-benzoyl-7,8-dimethoxy-2-oxo-1-phenyl-1,2,4,5-tetrahydro-3-benzazepine in 1 liter tetrahydrofuran is added dropwise and the reaction mixture is refluxed for 3 days. After cooling in ice 11.4 ml. water, 8.5 ml. 20 percent aqueous sodium hydroxide and 40 ml. water are added in this order and the mixture is filtered. The filtrate is evaporated, the residue triturated with diethyl ether and recrystallized from diethyl ether-benzene to yield the 3-benzyl-7,9-dimethoxy-1-phenyl-1,2,4,5-tetrahydro-3-benzazepine of the formula

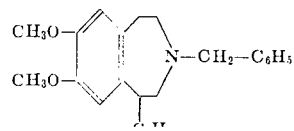

The starting material is prepared as follows: To the rapidly stirred mixture of 6.0 g. 7,8-dimethoxy-2-oxo-1-phenyl-1,2,4,5-tetrahydro-3-benzazepine and 2.44 g. N,N-dimethylaminline, 2.84 g. benzoyl chloride are added dropwise and the whole is heated on the steam bath for 3 hours. After cooling it is stirred into 50 ml. water containing 1 ml. 2.5 N-hydrochloric acid. The precipitate formed is filtered off and recrystallized from ethanol to yield the 3-benzoyl-7,8-dimethody-2-oxo-1-phenyl-1,2,4,5-tetrahydro-3-benzazepine melting at 175°–178°.

EXAMPLE 6

The solution of 7.,0 g. 8-chloro-1-phenyl-3-formyl-1,2,4,5-tetrahydro-3-benzazepine in 100 ml. tetrahydrofuran is slowly added to the mixture of 1.4 g. lithium aluminum hydride in 100 ml. tetrahydrofuran, while stirring and refluxing the mixture overnight. After cooling 1.4 ml. water, 1.1 ml. 20 percent aqueous sodium hydroxide and 5 ml. water are added in this order and the mixture filtered. The filtrate is evaporated in vacuo and the residue recrystallized from ethanol to yield the 8-chloro-1-phenyl-3-methyl-1,2,4,5-tetrahydro-3-benzazepine of the formula

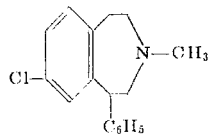

melting at 157°–159°.

The starting material is prepared as follows: The mixture of 100 g. 2-(4-chloro-phenyl)-ethylamine and 116 g. ethyl mandelate is slowly heated up to 155° while stirring until the theoretical amount of ethanol has been collected. The residue is recrystallized from ethanol to yield the mandelic acid 2-(4-chloro-phenyl)-ethylamide melting at 94°–96°.

The mixture of 185 g. thereof and 1.0 kg. polyphosphoric acid is heated to 60°–70° while stirring and the now exothermic mixture kept at this temperature for 1 ½ hours. It is then cooled, poured onto ice, the precipitate formed filtered off, washed with water and recrystallized from acetonitrile to yield the 8-chloro-2-oxo-1-phenyl-1,2,4,5-tetrahydro-3-benzazepine melting at 220°–222°.

The solution of 30 g. thereof in 700 ml. tetrahydrofuran is slowly added to the mixture of 4.2 g. lithium aluminum hydride and 700 ml. tetrahydrofuran while stirring. The mixture is refluxed for 2 days, cooled and 4.2 ml. water, 3.0 ml. 20 percent aqueous sodium hydroxide and 14.7 ml. water are added in this order. It is filtered, the filtrate evaporated in vacuo, the residue distilled and the fraction boiling at 175°–185°/0.05 mm. Hg collected; it represents the 8-chloro-1-phenyl-1,2,4,5-tetrahydro-3-benzazepine.

To the mixture of 6.0 g. thereof in 10 ml. chloroform, the solution of 3.2 g. chloral hydrate in 10 ml. chloroform is added while stirring and cooling. The mixture is stirred at room temperature overnight and finally heated at a steam bath for one-half an hour. It is evaporated in vacuo, to yield the 8-chloro-1-phenyl-3formyl-1,2,4,5-tetrahydro-3-benzazepine, which is used without further purification.

EXAMPLE 7

To the stirred mixture of 28.5 g. 8-chloro-1-(4-chlorophenyl)-1,2,4,5-tetrahydro-3benzazepine, 250 ml. benzene, 10.6 g. sodium carbonate and 1 drop water, the solution of 12.5 g. 2-bromoethanol in 100 ml. benzene is added and the whole refluxed for 1 day. The hot mixture is filtered, the filtrate evaporated, the residue distilled and the fraction boiling at 230°–250°/0.01 mm. Hg collected; it represents the 3-(β-hydroxyethyl)-8-chloror-1-(4-chloro-phenyl)-1,2,4,5-tetrahydro-3benzazepine of the formula

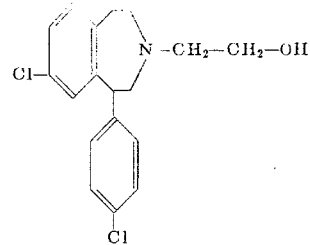

The starting material is prepared as follows: The mixture of 100 g. 2-(4-chloro-phenyl)-ethylamine and 120 g. ethyl 4-chloro-mandelate is slowly heated to about 155° until the theoretical amount of ethanol has been collected. The residue is recrystallized from aqueous ethanol to yield the 4-chloro-mandelic acid 2-(4-chloro-phenyl)-ethylamide melting at 85°–87°.

The mixture of 50 g. thereof and 250 g. polyphosphoric acid is heated to 70°–90° for 5 hours while stirring. The cold mixture is poured onto ice, the precipitate formed filtered off, washed with water and recrystallized from acetone to yield the 8-chloro-21-(4-chloro-phenyl)-1,2,4,5tetrahydro-3-benzazepine melting at 231°–233°.

The solution of 22.5 g. thereof in 700 ml. tetrahydrofuran is added slowly to the mixture of 3.1 g. lithium aluminumhydride in 700 ml. tetrahydrofuran while stirring. The mixture is refluxed for 2 days whereupon 4 ml. water, 3 ml. 20 percent aqueous sodium hydroxide and 14 ml. water are added in this order. The precipitate formed is filtered off, the filtrate evaporated in vacuo, and the residue recrystallized from diethyl ether to yield the 8-chloro-1-(4-chloro-phenyl)-b 1,2,4,5-tetrahydro-3-benzazepine melting at 107°–110°.

We claim:
1. A compound having the formula

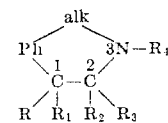

in which R is unsubstituted phenyl, Ph is 1,2-phenylene substituted up to two lower alkoxy groups, each of $R_1$, $R_2$ and $R_3$ is hydrogen, $R_4$ is straight guanylmercapto-lower alkyl or halo-lower alkyl in which the heteroatoms are separated from the 3-nitrogen atom by at least two carbon atoms, and alk is 1,2-ethylene, or a therapeutically useful acid addition salt thereof.

2. A compound as claimed in claim 1 and being the 3-(β-chloroethyl)-7,8-dimethoxy-1-phenyl-1,2,4,5-tetrahydro-3-benzazepine or a therapeutically acceptable acid addition salt thereof.

3. A compound as claimed in claim 1 and being the 3-(β-guanylmercapto-ethyl)-b 7,8-dimethoxyl-1-phenyl-1,2,4,5tetrahydro-3-benzazepine or a therapeutically acceptable acid addition salt thereof.

PO-1050
(5/69)

UNITED STATES PATENT OFFICE
CERTIFICATE OF CORRECTION

Patent No. 3,609,138     Dated September 28, 1971

Inventor(s) Robert Paul Mull et al

It is certified that error appears in the above-identified patent and that said Letters Patent are hereby corrected as shown below:

Column 8, claim 3, line 64, delete "ethyl)-b 7,8-dimethoxyl", and substitute --- ethyl)-7,8-dimethoxy ---.

Signed and sealed this 27th day of June 1972.

(SEAL)
Attest:

EDWARD M. FLETCHER, JR.          ROBERT GOTTSCHALK
Attesting Officer                 Commissioner of Patents